Patented Apr. 15, 1947

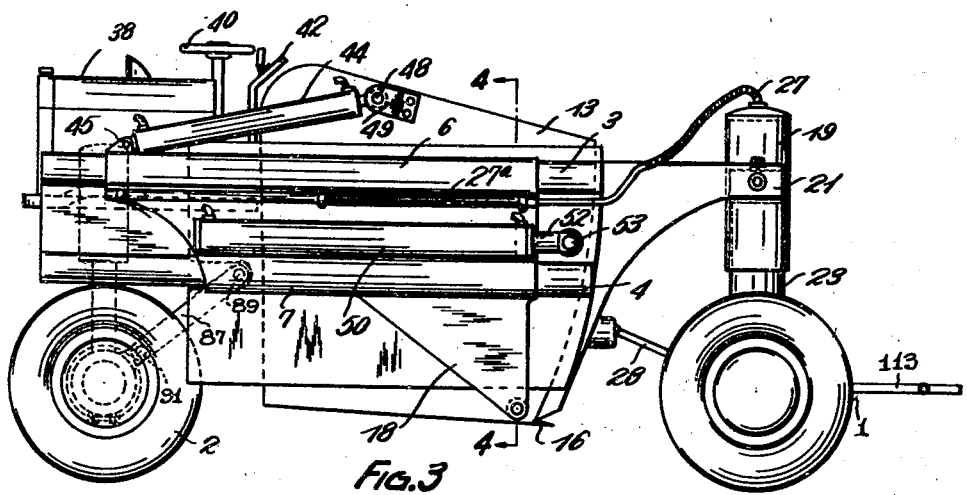

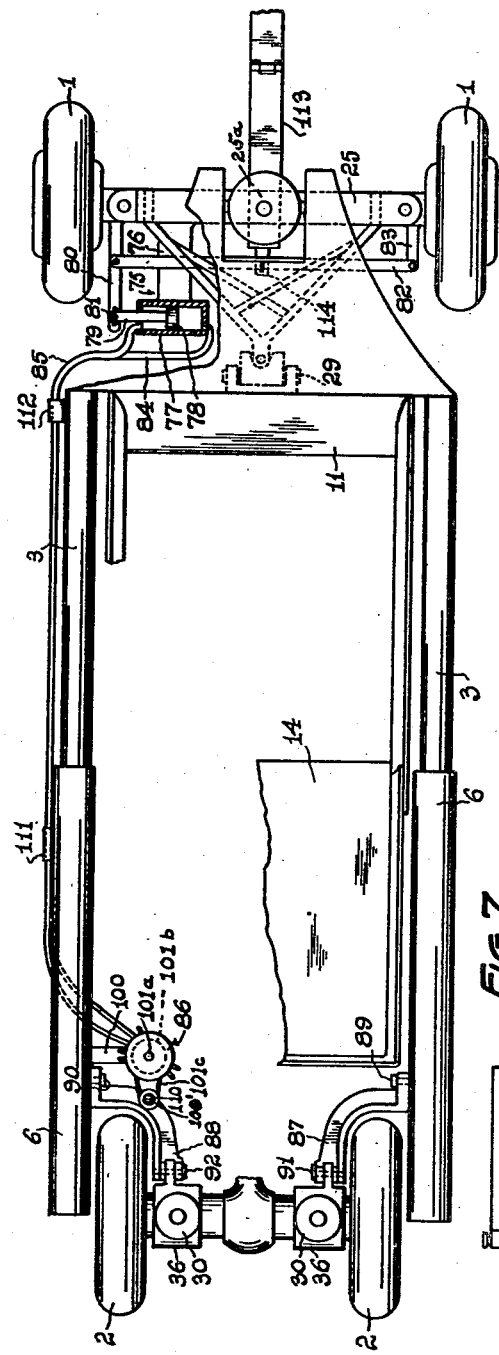

2,418,813

UNITED STATES PATENT OFFICE 2,418,813

SCRAPER

Walter R. Anderson, Cleveland, Ohio

Application October 13, 1941, Serial No. 414,862

5 Claims. (Cl. 37—126)

The present invention involves a novel type of dirt scraping and hauling vehicle designed primarily for larger operations of dirt removal and transportation. The above class of vehicles is being extensively used today in conjunction with large projects where enormous quantities of dirt, earth, or stone, are required to be removed from one site to another as where dam projects, levees, and road building contracts, or the like, are to be built.

Customarily, dirt scraping and hauling vehicles, such as referred to, involve the employment of a body for the vehicle having scraping equipment to dig into and scrape up dirt as the vehicle is propelled forwardly either by self contained power or motor means, or by being driven or pushed by traction vehicles. Suitable devices are employed to dump the dirt when received in the vehicle body and to control its spreading when dumped, as well as to hold the dirt in the body during the travel movement of the latter to transport the contents of the vehicle from one place to another.

The design of the vehicle of the present invention is novel in that I utilize a special type of frame or chassis which is made up of relatively slidable sections. Upon one of the frame sections is carried a dirt scraping and holding body or receptacle section, and upon the other of the frame members is carried a scraping and closing body section for cooperation with the dirt scraping and holding section.

Novel means are employed for causing relative raising and lowering movements of the body sections with respect to the supporting ground or traction wheels whereby to properly adjust the body sections for their cooperative work in the operation of filling the scraping and holding body section with dirt or material to be transported by the vehicle.

By reason of the relative slidable construction of the frame members of the vehicle, I am enabled to utilize both of the body members as scrapers, the front scraping and closing body member being adapted by its scraping function to facilitate the entire filling of the rear scraping and holding member in order that a maximum load may be received in the latter to be carried from the place of receiving to the place of deposit or spreading.

Novel means for effecting a dumping action of the rear scraping and holding body section are provided, and the invention involves other novel details of the construction and operation of the general assembly of parts used.

The general construction of a vehicle built in accordance with my invention is disclosed in the accompanying drawings, in which:

Figure 1 is a top plan view of the vehicle, certain of the fluid pressure conduits being broken away, or not illustrated.

Figure 2 is a side elevational view of the construction as depicted in Figure 1, illustrating the vehicle with the frame members expanded to their maximum extent, with the scraping and holding body section lowered as shown in full lines for performing its scraping and dirt receiving function; the dotted lines in the figure illustrating the rear scraping and holding section of the body in tilted or dumped position.

Figure 3 is a view similar to Figure 2 with the frame members collapsed or brought together as when arranged after the dirt has been scraped into the dirt scraping and holding section of the body, and the body and frame elevated in respect to the wheels into the travelling position for transportation of dirt.

Figure 4 is a fragmentary vehicle sectional view through one side portion of the vehicle body taken about on the line 4—4 of Figure 3.

Figure 5 is a view showing the mounting means between the front end of the frame and the front axle; also, the power cylinder for elevation of the body and frame relatively to the front axle and wheels.

Figure 6 is a vertical sectional view showing the mounting means between the rear axle and the rear end of the frame and one of the power cylinders for the elevation of the rear end of the body and frame relatively to said axle.

Figure 7 is a top plan view of the vehicle with certain portions of the body broken away to show the rear end braces and front wheel assembly steering means.

Figure 8 is a fragmentary sectional view showing the driving connection between the motor and the rear axle.

Figure 9 is a rear view of the vehicle.

Figure 10 is a detailed sectional view of the control valve operated by the steering wheel.

Figure 1:
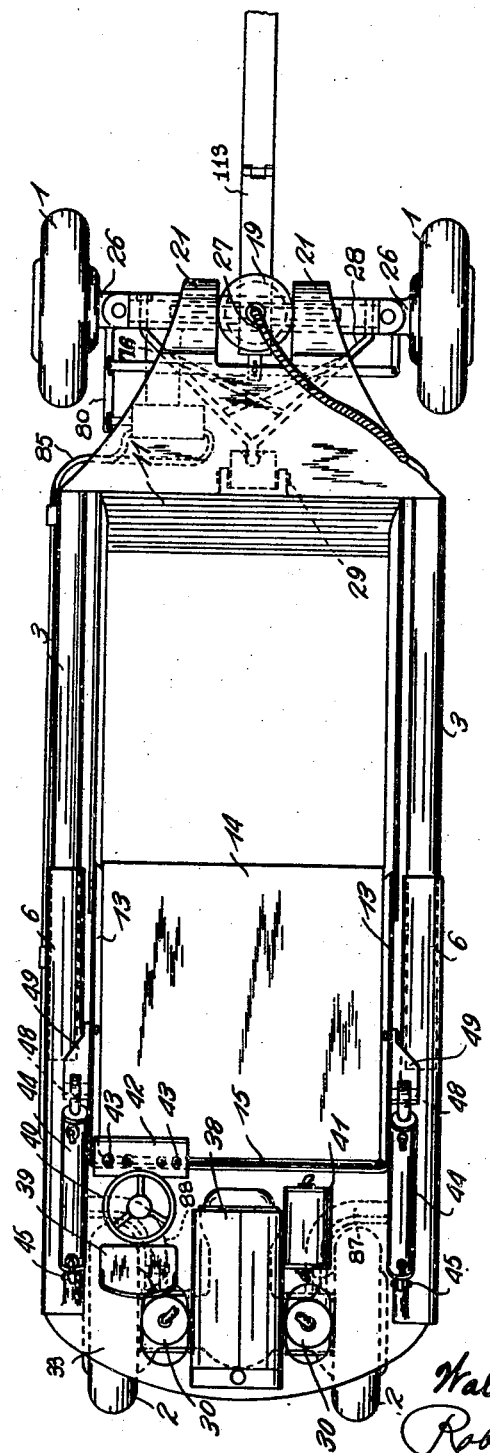

Specifically describing the invention, 1 in the drawings denotes the front wheels of the vehicle and 2 the rear wheels. The frame of the vehicle is made up of the front frame members 3 and 4 in the form of tubular sections connected by a plate or web 5, and rear frame members 6 and 7 which are connected together by spaced plates 8 and 9, the members 6 and 7 also being formed of tubular sections and being of a sufficient size to receive therein respectively the frame members 3 and 4.

The plates or webs 8 and 9 are spaced sufficiently to receive thereby the web or plate 5. It will thus be seen that the vehicle frame is composed virtually of a front section made up of the parts 3, 4 and 5, and a rear section made up of the parts 6, 7, 8 and 9, in which the front section parts telescope or slide so that by the operation of suitable instrumentalities the entire frame of the vehicle may be collapsed to the condition of Figure 3 from the expanded condition of Figure 2.

The body of the vehicle is made up of the front scraping and closing section comprising opposite sides 10 and a front plate 11, the latter curving from its upper edge downwardly and rearwardly and having a scraper 12 at its lower edge projecting slightly below the lower edges of the sides 10. The front section of the body thus described is adapted to slide rearwardly with the front frame section or members previously set forth, since the sides 10 and front plate 11 are supported by and upon the frame members 3 and 4.

The body of the vehicle also comprises a rear section which, for the purposes of this description, is called the dirt scraping and holding section and the same is made up of the sides 13, the bottom 14, and the rear end or wall 15. At the front edge of the bottom 14 is provided the scraper 16. Said dirt scraping and holding section of the body of the vehicle is supported pivotally at 17 upon side plates 18 which depend from the inner webs or plates 8 of the rear frame members or section of the vehicle, said depending plates 18 being welded or otherwise secured by bent-out upper end portions 18a attached to the web portions 8 of the rear frame members previously described.

Figure 2:
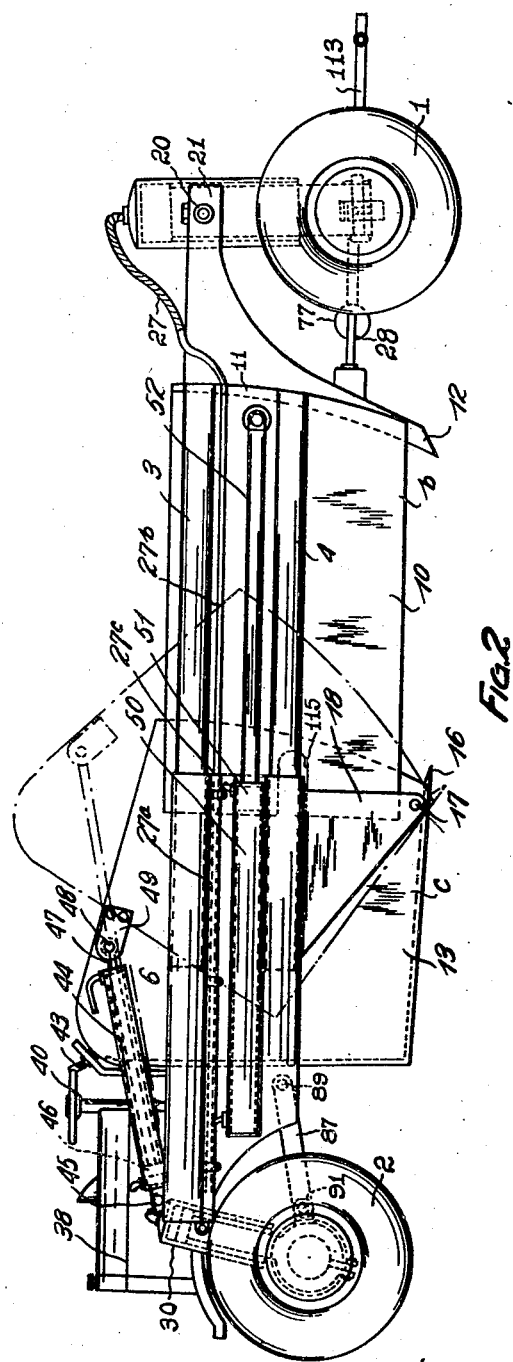

With the above construction in view, therefore, it will be seen that the rear scraping and holding section of the body is capable of movement pivotally upon the supporting or depending plates 18, whereby to be rocked from the lowered full line position shown in Figures 2 and 3 to the tilted dumping position shown in dotted lines in Figure 2. For the mounting of the vehicle body and frame upon the wheels 1 and 2, suitable provisions are had including, in respect to the front vehicle structure, a cylinder 19 having lateral trunnions 20 pivotally connecting the same to the forward spaced extensions 21 projecting forwardly from the front frame members 3 and 4 at the forward ends of the latter.

In the cylinder 19 is a piston 22 carried by a vertical post 23 having pivotal connection 24 at its lower end to the center of the front axle 25 of the vehicle, said axle being suitably connected at its ends by stub axles 26, see Figure 5, with the wheels 1. Admission of a pressure fluid into the upper end of a cylinder 19 from the conduit 27 will cause downward movement of the piston 22 and effect a relative raising of the front of the frame of the vehicle with the supported parts of the body.

Any suitable steering mechanism may be employed for the wheels 1 and the axle 25 may be suitably connected to the front side of the closing plate 11 by brace features, generally shown at 28, having pivotal connection at 29 to said plate or closing member 11.

The steering mechanism may comprise a suitable piston unit 75 rigidly supported on the front axle 25 by means of a brace 76. The piston unit 75 comprises an outer casing 77 having a two-way piston 78 reciprocable therein, parallel with respect to the front axle 25. A piston rod 79 suitably connected to the piston 78 will cause the steering link 80 connected with one of the stub axles 26 by means of the pivot and slot connection 81 to be rotated and effect a turning movement of a wheel 1 mounted thereon. It will be apparent that by connecting the link 80 by means of a tie rod 82 to the stub axle extension 83 of the other stub axle 26, a coordinated turning movement of the front wheels will be effected, when the piston unit 75 is reciprocated by a pressure fluid alternately entering opposite ends of the piston casing 77 through the conduits 84 and 85, under the control of a valve mechanism 86 located at the rear of the vehicle and controlled by the steering wheel 40 in a manner to be described.

At the rear thereof, the vehicle body and frame are mounted upon the rear axle by means somewhat similar to the piston and cylinder unit feature previously described with reference to the front end of the vehicle.

As shown in Figures 1 and 2, primarily, the rear ends of the frame members 6 project rearwardly beyond the rear section of the body sufficiently to be connected by a transverse plate or body member 33 receiving in spaced openings therein a pair of cylinders 30, each of which has pivotal connections by suitable trunnions 31 with supporting bracket means 32 on the body member 33 that is carried by the rear frame members 6.

Each cylinder 30 contains a piston 34 on a guiding and supporting post or shaft 35, the lower end of which passes through a guide opening at the bottom of each cylinder 30 and is coupled as shown at 36 to the rear axle housing 37 of the vehicle in which axle housing, an axle 98 drivably connected to the rear wheels 2, is supported.

The rear axle housing 37 is maintained in a driving position with respect to the vehicle by means of the braces 87 and 88, suitably pivotally engaged with the rear frame members 7 on the pivots 89 and 90 at the rear inner lower portions thereof, the lower ends of the braces 87 and 88 likewise having pivotal connection with the rear axle housing 37 by means of the pivots 91 and 92 respectively engaging the couplings 36. It is apparent that as the pressure fluid is released from the pistons, the weight of the body will effect an upward movement of the pistons 34, and a controlled pivotal movement of the cylinders 30 on the trunnion 31 thereof, will result.

By the admission of pressure fluid in the upper ends of the cylinders 30, relative downward movement of the pistons 34 may be compelled, and thus upward movement of the frame and body caused in an obvious manner, relatively to the wheels 2.

It is preferred that the vehicle be propelled by self contained power, for which purpose a motor or engine 38 is carried upon the rear plate structure 33 of the frame, and thus the weight of the motor is employed to assist for traction purposes being borne directly by the rear wheels 2.

The drive from the motor 38 to the rear axle 98 is obtained by means of a drive shaft 93 having long external splines thereon, slidable in a mating splined member 94 suitably rotatably supported in the housing extension 95 of the rear axle housing 37, and drivably connected to the rear axle 98 through conventional differential means, not shown, but apparent to those skilled in the art. The end of the drive shaft 93, opposite the splined portion thereof, is connected to the power output shaft 97 of the motor transmission 95' through the means of a conventional pair of universal joints 96. The drive is thereby effectively transmitted to the said rear axle 98 in all positions of the rear axle 98 and the wheels 2, by which the rear end of the vehicle is supported. At the rear end of the vehicle is located the operator's seat or station 39, adjacent to the steering wheel 40.

It is contemplated that certain of the operating parts of the vehicle shall be operated by fluid pressure means for which purpose a fluid pressure pump 41 is availed of, being supported near the engine or motor 38 and being equipped with suitable conduits or pipes that run to the cylinders 19 and 30 and other cylinders to be hereinafter described.

The conduits or pipes are only partially illustrated because their arrangement upon the vehicle may be such as is suitable for constructions of this type and is immaterial to the invention.

The steering wheel 40 operates the valve mechanism 86, to be more fully described hereinafter, in a manner to cause the admission of fluid pressure to alternate ends of the steering piston unit 75 for turning the front wheels 1. The valve means 86 comprises an outer casing 99 supported on the rear body member 18a by means of an arm 100 suitably rigidly fastened thereto. Within the valve casing 99 may be a conventional rotary valve mechanism adapted to alternately direct the flow of fluid pressure through the conduits 84 and 85, and relieve the pressure in said conduits, as desired, to effect the turning action of the front wheels 1. The valve may be constructed so as to have fitted therein, a rotary valve element 101, having a passage 102, with a flared end 103, adapted to direct fluid pressure to one or the other of the conduits 84 or 85. Arcuate passages 104 and 105 are provided in the valve element 101 to bleed the fluid pressure from the side opposite the piston 78 of the steering piston unit 75 which is being acted upon by the fluid pressure in the conduit 84 or 85, back to the pressure pump, by means of passages 106 and 107 in the valve casing 101, to which suitable conduits 109 and 108 respectively are connected. Ball check valves, not shown, will be provided in the last named conduits to prevent the fluid pressure pump 41 from forcing liquid back through the line 84 or 85, not being utilized at the time. The fluid pressure is directed to the rotary valve element 101 through conduits 102a and 102b, leading from pump 41.

The lower end of the shaft 101a on which the valve element 101 rotates may be provided with a pulley or sprocket 101b and operable by means of a belt or chain 101c, trained around a similar pulley or sprocket 109', keyed to the lower end of the steering wheel shaft 110, whereby the valve element 101 may be rotated and cause fluid pressure to flow to one end of the steering piston unit 75, or the other end, as desired.

Instead of supplying the vehicle of my construction with motive power and steering mechanism as described, it is within the scope of my invention to provide the vehicle with a conventional towing means 113 pivotally connected to the front axle 25 at 25a and the rod 82 at 114, whereby the vehicle may be pulled by a tractor or similar towing vehicle. It will be understood that under the above conditions the fluid pressure pump 41 and conduits connected thereto will be controlled from the said towing vehicle.

A valve board 42 is located in front of the steering wheel 40, accessible to the operator at the operator's station 39 and comprises a plurality of valves 43 of a suitable type for the purposes of the invention. One of the valves will control the supply of pressure fluid to the cylinder 19. One of the valves 43 will control the passing of fluid simultaneously through suitable conduits to the cylinders 30. Another of the valves 43 will supply pressure fluid to the opposite ends of the cylinders 44. The cylinders 44 are pivotally mounted at their rear ends at 45 so as to swing up and down, and in the cylinders 44 are pistons 46, the piston rods 47 of which are pivotally connected to their front ends at 48 to brackets 49 attached to opposite sides of the scraping and holding body section or rear section of the vehicle body, at the upper portion of the sides 13 of the latter.

By the introduction of fluid pressure medium at the rear ends of the cylinders 44 to act upon the pistons 46, the piston rods 47 will be actuated to rock the rear body section of the vehicle to the dotted line position of Figure 2. Admission of the pressure fluid medium to the front ends of the cylinders 44, on the other hand, will compel rearward movement of the pistons 46 and cause a movement of the rear body section of the vehicle from the dotted line position of Figure 2 to the full line position in which it may perform its dirt scraping and receiving function.

By reference to Figures 2 and 4 particularly, it will be seen that mounted on the rear frame members 7 and 9, by being attached by welding or in any suitable way, are power cylinders 50 in which are received the operating pistons 51. The pistons 51 have piston rods 52 pivotally connected at their front ends at 53 to the front portions of the sides 10 of the front scraping and closing section of the vehicle. Another of the valves 43 controls the admission of the pressure medially supplied by the pump 41 to the front and rear ends of the cylinders 50, there being one of these cylinders 50 at each side of the rear body section of the vehicle supported in the manner described.

Having in mind that the front section and frame members of the vehicle are slidable rearwardly and forwardly relatively to the rear body section and frame members, it is obvious that such relative movements of the parts may be controlled through the said valve 43 supplying the fluid pressure medium from the pump 41 to the cylinders 50 at opposite sides of the pistons 51 therein. Suitable cut-out portions 115 of the sides 10, are provided to permit the full rearward operation of the members 10, which would be prevented by the ends of braces 87 and 88 pivoted at 89 and 90.

The foregoing having presented the essential structural and operating features of construction of my vehicle, I will now describe the operation thereof in conjunction with the illustrations in the drawings, and particularly referring to Figures 2 and 3.

In Figure 3, the vehicle parts are arranged for traveling movement from one place to another under power generated by the motor 38. To effect a scraping action and a dirt loading action, one of the valves 43 is first operated to admit fluid pressure to the cylinder 50 to cause a movement of the front and rear body sections apart from each other to a position as substantially shown in Figure 2. Another of the valves 43 is then operated to permit fluid to leave the cylinders 30 thereby permitting a downward movement of the rear portion of the scraper, the weight of the scraper being effective to force fluid from the cylinder 30. This downward movement is continued until the scraper blade 16 contacts the ground whereupon the valve 43 controlling such downward movement will be operated to prevent the further escape of fluid from the cylinders 30. In such position, the front end of the scraper will occupy a higher position of elevation with respect to the ground than will the rear end and the scraper 12 will be positioned above the surface of the ground so as not to interfere with the scraping action of the blade 16. The motor 38 may then be operated to drive the entire body forwardly and effect a scraping action by the blade 16 to fill the rear section of the scraper with a load of dirt.

When the rear vehicle section has been filled as much as possible by the action of the scraper 16, the front section of the body of the vehicle and the frame may be lowered relatively to the wheels 1 by operating a selected one of the valves 43 to permit the fluid pressure medium in the cylinder 19 to pass therefrom. This will cause a lowering of the front end of the vehicle body and permit the scraper blade 12 of the scraping and closing section of the vehicle body to move into engagement with the earth. Thereupon, by manipulation of a certain valve 43 controlling the fluid pressure medium entering the cylinders 50, the pistons 51 may be operated to pull rearwardly the front frame and body section of the vehicle, the frame members 3, 4 and 5 sliding in this case into the frame members 7, 8 and 9 by telescopic action. The scraper 12, by this operation will scrape and gather earth sufficiently to complete the filling of the rear body section of the vehicle and ensure a maximum load being scraped into the vehicle body without the necessity of employing a pushing action of an additional traction vehicle such as a tractor in the manner required by many scrapers now in common use.

Assuming that the operation of completing the filling of the vehicle body has been effected and the front and rear parts of the vehicle body and frame have been moved toward each other, as shown in Figure 3, appropriate valves 43 may then be operated to admit fluid pressure to the cylinders 19 and 30 to cause relative downward movement of the pistons in these cylinders to effect an upward movement of the body and frame and obtain the necessary clearance of the scraper body from the ground somewhat as illustrated in Figure 3. Thereupon, the motor 38 may be operated to effect a travel movement of the vehicle over the ground to the site where the dirt is to be deposited and when said site is reached, the pistons 51 will be again operated, this time to push forwardly the piston rods 52.

By reason of the location of the cylinder 19 with respect to the pump 41 and valves 43, it is necessary to conduct pressure fluid a considerable distance in order to effect an elevating movement of the front end of the vehicle body. Since the fluid must be under considerable pressure, there would be considerable danger of breakage of the conduit if a flexible conduit of considerable length were provided as would be necessary to compensate for the movement of the cylinder 19 relative to the pump 41. In order to prevent the necessity of a flexible conduit of excessive length and to compensate for relative movement of the cylinder 19, there is provided a novel coupling for connecting the flexible conduit 27 to the valve control conduit. Referring to Figure 2, the valve control conduit is indicated by 27a and comprises a rigid cylindrical tube secured with respect to the frame member 6. Slidably receivable within the tube 27a is a second cylindrical tube 27b which is secured to the end section 11 for movement therewith and is coupled to the flexible conduit 27. A suitable packing gland (not shown) may be provided at the point 27c to prevent leakage of fluid from the end of the tube 27a. In this manner, the tubes 27a and 27b are telescopically movable with respect to each other on movement of the front and rear ends of the scraper toward and away from each other and are operative to transmit fluid under pressure to the conduit 27. It will be apparent that the steering piston control conduits 84 and 85 may be similarly fabricated and supported on the side frame members 3 and 6 by suitable means, as the straps 111 and 112.

If the dirt is to be deposited in a layer form for spreading, as it drops from the vehicle body, the distance of pushing forward of the rods 52 may be regulated to control the opening movement of the front end of the vehicle body by limiting the forward movement of the closing plate or member 11 a distance depending upon thickness of the stream of dirt to be spread. In this manner, the contents of the vehicle body previously loaded thereinto by the scraping actions described will be deposited upon the ground at the place to which the earth is to be moved, in a self evident manner.

For facilitating the depositing action of the dirt on the ground and/or spreading, it will, of course, be understood that the operator at the control station 39 will operate the valve 43 controlling the pistons in the cylinders 44 and effect a rocking upwards of the rear body section to produce a dumping action thereof for emptying the same through the space between the front scraper 12 and the rear scraper 16.

After an unloading of the dirt from the vehicle body, the valves 43 will then be operated to effect an operation of the various cylinders to move the front and rear sections of the body toward each other to the position as shown in Figure 3. The vehicle may then be returned at travel speed to the place where the dirt is to be again gathered or collected into the body and when the vehicle reaches such place, the pistons 51 will be operated to expand the frame members and sections of the body to the positions shown in Figure 2, and the pistons 22 and 34 will be controlled to cause a relative lowering of the frame members and body in respect to the wheels 1 and 2 ready for another dirt scraping and hauling operation.

I believe it is new in the art to avail of a vehicle structure which is made in sections, each of which is equipped with scraping means whereby a forward scraping and a rearward scraping action of members of the vehicle body may be produced so as to ensure the complete or maximum filling of the scraper body in the manner hereinbefore set forth.

Although there is shown a telescopic tubular construction comprising the parts 3—9 for mounting the front and rear sections of the vehicle body for relative movement toward and away from each other, it will be understood that any other suitable connection permitting such movement may be employed in place of the parts 3—9 for this purpose. It will also be understood that suitable driving means for moving the sections of the body toward and away from each other may be employed in place of the hydraulic means comprising the pump 41 and the connections therefrom to the control valve 43 and the hydraulic cylinder 50.

It is further to be understood that the form of the invention herewith shown and described is to be taken as a preferred example of the same and that various changes in the shape, size and arrangement of the parts may be resorted to without departing from the spirit of the invention.

Having thus described my invention, what I claim as new and desire to secure by Letters Patent of the United States, is:

1. In a scraper vehicle, in combination, a vehicle frame, a dirt receiving body on the frame comprising a first scraper disposed to dig into and scrape undug earth in one direction to pass into the body, a second scraper mounted on said frame independently of the said first scraper and including a relatively vertically disposed earth penetrating portion to dig into undug earth at a point spaced from the first scraper and movable in a direction opposite to that in which the first scraper scrapes, means for lowering the body with the first scraper to dig into the undug earth and move it horizontally to scrape up said earth to enter the body, and controlling means to lower the second scraper to penetrate undug earth and maintain said second scraper against upward movement when so engaged in the earth, and means to move the second scraper horizontally, while forcibly maintained at its digging depth, to scrape up said earth and carry the same toward the first scraper into the dirt receiving body.

2. In a scraper vehicle, in combination, a vehicle frame, a dirt receiving body on the frame comprising a rear scraper facing forwardly, means to cause said rear scraper to dig into undug earth and to move it slidably forward in a horizontal direction to scrape said earth to cause the earth to enter the body, and a front scraper mounted on said frame to move independently of the rear scraper and comprising a relatively vertical scraper member adjustable to a position in spaced relation in advance of the rear scraper and movable downward to dig into undug earth, means to force the front scraper downwardly to cause it to dig into the undug earth in a substantially vertical direction to a controlled depth and positively holding it at such depth, and means for then moving the front scraper, while so disposed, horizontally relatively to the rear scraper and opposite to the said direction of movement of the rear scraper, to dig and scrape the earth engaged thereby into the body to accumulate with the earth already therein dug and scraped by the rear scraper.

3. In a scraper vehicle, in combination, a frame, a dirt receiving body on the frame comprising a rear scraper adapted to dig into and scrape undug earth in a relatively forward direction, a front scraper including a vertical scraper blade mounted on the frame independently of the rear scraper and movable in a relatively rearward direction and adjustable to a position spaced some distance in advance of the rear scraper, and means to transmit a downward force to move said rear scraper and also said front vertical scraper blade downwardly to cause each of them to dig down into undug earth and to hold the vertical blade against any upward movement relatively to the frame, and means to slide the scrapers horizontally relatively toward each other while the front scraper is prevented from upward movement relative to the frame to cause earth dug up between and by each of said scrapers to be accumulated in the body by both scrapers.

4. In a scraper, in combination, a vehicle frame, a dirt receiving body on said frame comprising a first scraper attached to the body, traction means to move the body with its scraper to engage the said scraper into undug earth for digging and scraping up the latter into said body, a second scraper mounted on the frame independently of the first scraper, and adjustable to a position spaced from the first scraper and comprising a vertically disposed scraper member, the lower edge of which is adapted to dig into the undug earth at a point spaced from the first scraper, instrumentalities on the frame for causing the body attached scraper to engage into the undug earth, instrumentalities to transfer weight of the body and frame to the vertically disposed scraper member to effect undug earth penetration thereby and prevent upward movement of said last member relative to the body and frame, and instrumentalities operable independently of the traction means to cause the vertical scraping member while so maintained in earth penetrating position to slide horizontally relatively toward the body attached scraper to dig and scrape the undug earth into the body for carrying off to a place of deposit.

5. In a scraper vehicle, in combination, a frame, a dirt receiving body on the frame comprising a rear scraper facing forwardly, means to cause said rear scraper to dig into undug earth and then move it slidably forward in a horizontal direction to dig and scrape said earth in a forward direction to cause the earth to enter the body, a front scraper comprising sides and a relatively vertical scraping member positionable a considerable distance in front of the rear scraper and having its lower edge projecting some distance below the said sides so as to dig undug earth ahead of the rear scraper, means to lower the front scraper to cause it to engage in the undug earth in a substantially vertical direction and then move the front scraper in a horizontal direction opposite to the said direction of movement of the rear scraper and independently of the rear scraper, while said front scraper is so vertically disposed, to dig and scrape the earth into the body to accumulate with the earth already therein dug and scraped by the rear scraper.

WALTER R. ANDERSON.

REFERENCES CITED

The following references are of record in the file of this patent:

UNITED STATES PATENTS

| Number | Name | Date |
| --- | --- | --- |
| 2,124,408 | Adams | July 19, 1938 |
| 2,256,051 | Haile | Sept. 16, 1941 |
| 2,179,532 | Walch | Nov. 14, 1939 |